United States Patent
Rautiainen et al.

(10) Patent No.: US 6,711,175 B1
(45) Date of Patent: Mar. 23, 2004

(54) PROCEDURE FOR SCANNING OR DISCONNECTING A MODULE LINE IN A V5.2 ACCESS NODE

(75) Inventors: Jaakko Rautiainen, Oula (FI); Martti Yrjänä, Tupos (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/292,287

(22) Filed: Apr. 15, 1999

Related U.S. Application Data

(63) Continuation of application No. PCT/FI97/00613, filed on Oct. 8, 1997.

(30) Foreign Application Priority Data

Oct. 17, 1996 (FI) .................................................. 964177

(51) Int. Cl.$^7$ ................................................. H04L 5/22
(52) U.S. Cl. ...................................... 370/458; 370/463
(58) Field of Search ................................. 370/351, 352, 370/353, 354, 355, 356, 357, 401, 402, 403, 404, 458, 462, 463; 379/32.04, 220.01

(56) References Cited

U.S. PATENT DOCUMENTS 5,754,555 A * 5/1998 Hurme et al. ................ 370/522
5,781,623 A * 7/1998 Khakzar ....................... 379/230

FOREIGN PATENT DOCUMENTS

| EP | 0 731 618 | 9/1996 |
| EP | 0 792 079 | 8/1997 |
| WO | WO 95/01019 | 1/1995 |
| WO | WO 97/35404 | 9/1997 |

OTHER PUBLICATIONS

A. Gillespie "Interfacing Access Networks to Exchanges—The ETSI V5 Approach" *IEEE Global Telecommunication Conference*, vol. 3, pp. 1754–1758.

K. Khakzar "V5 Interfaces between Digital Local Exchanges and Access Networks" *Frequenz*, vol. 48, No. 1–2, pp. 44–50.

International Search Report for PCT/FI97/00613.

* cited by examiner

*Primary Examiner*—Steven H. D Nguyen
*Assistant Examiner*—Duc Duong
(74) *Attorney, Agent, or Firm*—Squire, Sanders & Dempsey L.L.P.

(57) ABSTRACT

Procedure for scanning a module line or time slot in a V5 access node connected to a local exchange via a V5 interface and with a number of subscribers connected to it via a concentrating link, in which procedure a time slot in the V5 interface is scanned by transmitting by means of the part of the BCC protocol associated with the local exchange a scanning message to the part of the BCC protocol associated with the V5 access node, which latter protocol part acknowledges receipt of the scanning message. According the the present invention, before receipt of the scanning message is acknowledged, the concentrating subscriber interface is scanned to find in it a free module line or time slot for the call and the free module line or time slot is specified.

9 Claims, 2 Drawing Sheets

PROCEDURE FOR SCANNING OR DISCONNECTING A MODULE LINE IN A V5.2 ACCESS NODE

This application is a continuation of international application number PCT/FI97/00613, filed Oct. 8, 1997, pending.

BACKGROUND OF THE INVENTION

1. Field of the Invention

The present invention relates to a procedure as defined in the preamble of claim 1 for scanning or disconnecting a transmission line in a V5.2 access node.

2. Description of the Related Art

There are at least two commonly known methods for connecting subscribers to a local exchange. In the first method, the subscriber is connected via a subscriber line directly to the local exchange or to an access module connected to it, while in the second method the subscriber is connected to an access network whose access node is connected to the exchange.

Open interfaces (V5.1 and V5.2) between an access network and a local exchange are defined in the ETSI (European Telecommunications and Standards Institute) standards of the ETS 300 324 and ETS 300 347 series. V5 interfaces enable subscribers belonging to a physically separate access network to be connected to a telephone exchange using a standard interface. In this application, V5 interface means expressly a dynamic concentrator interface (V5.2) consistent with the standards ETS 300 347-1 and 347-2, which consists of one or more (1–16) PCM (Pulse Code Modulation) cables. One PCM cable contains a total of 32 channels, each with a transfer rate of 64 kbit/s, i.e. 2048 kbit/s in all. The V5.2 interface supports analogue telephones as used in the public telephone network, digital subscriptions, such as ISDN (Integrated Services Digital Network) basic and system subscriptions as well as other analogue or digital terminal equipment based on semi-fixed connections.

Terminal devices can be connected to the subscriber ports of the access node. The access node can be provided with one or more V5 interfaces. Subscriber ports are created in the V5 interface by associating an unambiguous address of each port with a given address in the V5 interface. In the local exchange, this address is created as a V5 subscriber. In other words, each subscriber port has an address which is associated with a V5 address and which uses a given time slot or given time slots for signalling to the local exchange.

It is also possible to connect a subscriber module to the access node and connect the subscriber lines to the subscriber module. In addition, it is possible to connect a remote subscriber node to the access node e.g. via a PCM (Pulse Code Modulation) cable. In this case, the number of subscribers connected to the subscriber module or remote subscriber node may exceed the number of calls that can be transmitted simultaneously with the capacity of the interconnecting feeder between the subscriber module or remote subscriber node. In this situation it is therefore necessary to employ concentration even in the interconnecting feeder. This may further lead to a situation where it is not possible to establish a connection from a subscriber port through the subscriber module or remote subscriber node and the access node to the local exchange because there is no free time slot or module line in the interconnecting feeder for the subscriber port. In this case, call setup will fail.

In a V5 access node in a prior-art system, according to the standard, the part of the BCC protocol (Bearer Channel Connection; a protocol by which a transmission line can be reserved (PSTN) or connected (ISDN) in a V5.2 interface) associated with the local exchange scans and specifies a free time slot in the V5 interface and then transmits an ALLOCATION message to the part associated with the access node. After this, the part associated with the access node acknowledges receipt of the message by sending an ALLOCATION$_{13}$ COMPLETED message. If the interconnecting feeder between the subscriber module or remote subscriber node is a concentrating one, a situation may occur where the capacity of the interconnecting feeder is insufficient for transmitting a call to a subscriber. Yet the call setup process in the local exchange advances on the basis of the ALLOCATION_COMPLETED message. When the call setup process has already reached an advanced stage, the access node attempts to scan a free time slot for the call, but the attempt may result in discovering that there is no free time slot and it is only then that the call setup is cancelled. Thus, the local exchange has reserved resources in the V5 interface, in the exchange itself and in the V5 access node for a call setup that fails because of insufficient capacity of the concent-rating interconnecting feeder.

SUMMARY OF THE INVENTION

The object of the present invention is to eliminate the problems described above. A specific object of the present invention is to present a new method for scanning a free module line or time slot from a connection formed from a V5 access node to a subscriber module or remote subscriber node at a correct and suitable stage with respect to call setup. A further object of the invention is to present a method that enables a subscriber module or remote subscriber node to be connected to a V5 access node via a concentrating link.

As for the features characteristic of the present invention, reference is made to the claims.

In the procedure of the present invention for scanning a module line or time slot in a V5 access node connected via a V5 interface to a local exchange and with a number subscribers connected to it via a concentrating link, a time slot in the V5 interface is scanned in accordance with the V5 standard by transmitting by means of the part of the BCC protocol associated with the local exchange, which may also be called a protocol object, a scanning message, such as an ALLOCATION message, to the part of the BCC protocol or protocol object associated with the V5 access node, which acknowledges receipt of the scanning message by issuing an ALLOCATION_COMPLETED message. In this context, scanning means a function or a series of functions designed to determine whether a line, channel or equivalent is free and available to the subscriber or call setup procedure. According to the invention, before receipt of the ALLOCATION message is acknowledged, i.e. before an ALLOCATION_COMPLETED message is transmitted, the concentrating subscriber interface is scanned to find a free module line or time slot, which is specified, preferably using the BCC protocol.

Once a module line or time slot is found, it is reserved for use in call setup and connected through the access node to the subscriber port indicated by the local exchange on the basis of the V5 interface time slot to be used, as indicated by the local exchange. Further, a route to the subscriber port indicated by the local exchange is determined, the specified module line or time slot is announced to the protocol controlling the call setup and a through connection is carried out to establish a user channel between the local exchange and the subscriber port. This ensures that while a time slot is reserved in the V5 interface, a free time slot or module line is also available for the call for further connection from the access node.

Depending on the application, the user channel may be a PSTN user channel, in which case subscribers are connected to the access node via an analogue connection and the switching of the module line is performed using the PSTN protocol, which transmits the signalling of analogue subscribers in the V5 interface. Further, the user channel may be an ISDN B-channel, in which case subscribers are digitally connected to the access node and the BCC protocol is used for the switching of the time slot.

Further, in an embodiment of the invention, a user channel set up by analogue or digital means can be disconnected via operations according to the invention. When a PSTN user channel is to be disconnected, the subscriber port reservation data are deleted via the BCC protocol and the link is disconnected via the PSTN protocol. When an ISDN user channel is to be disconnected, the subscriber port reservation data are deleted and the link is disconnected via the BCC protocol.

Depending on the application of the present invention, subscribers can be connected to a V5 access node via a remote subscriber node connected to it via a concentrating link. In this case, in practice subscribers are first collected into a network element of the remote subscriber node, which network element is connected to the access node e.g. via a PCM cable. On the other hand, subscribers can be connected to a V5 access node via a subscriber module connected to it via a concentrating link. Generally, the subscriber module is physically located in the same place as the access node, in which case a number of subscribers are connected to the subscriber module and the subscriber module is connected via a concentrating link to the access node.

As compared with prior art, the present invention has the advantage that the invention allows subscribers to be connected to an access node via a remote subscriber node or a subscriber module in addition to direct subscriber port connection in the access node. This also results in cost savings because it obviates the need to connect each subscriber to the access node via a separate cable.

A further advantage of the present invention is that the scanning of the concentrating interconnecting feeder is performed as early as possible, e.g. at the same time when a free time slot is reserved in the V5 interface, which means that resources of both the local exchange, the V5 interface and the access node are made available for other use if it is discovered that a call from the access node to the subscriber can not be set up.

BRIEF DESCRIPTION OF THE DRAWINGS

In the following, the invention will be described by the aid of a few examples of its embodiments by referring to the attached drawing, in which.

DETAILED DESCRIPTION OF THE PREFERRED EMBODIMENTS

Figure 1:
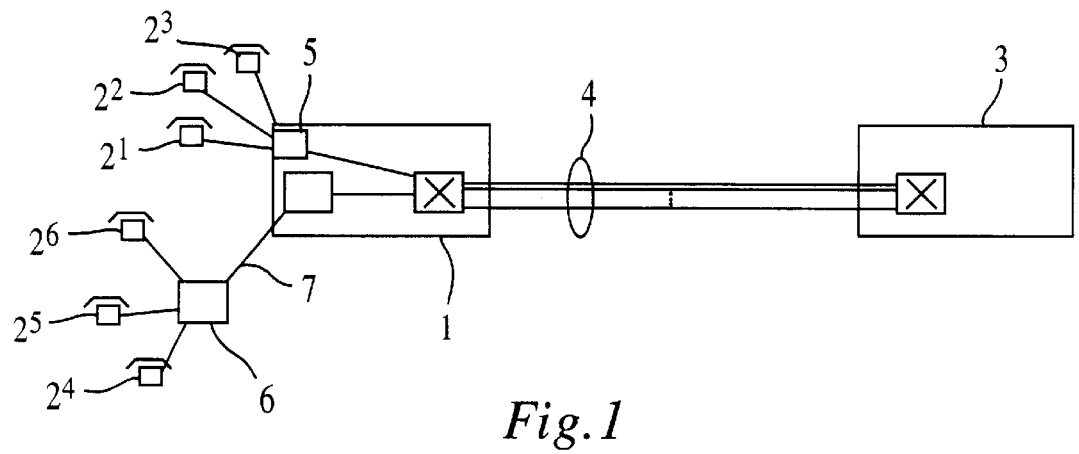
FIG. 1 presents a system according to the present invention.

The system presented in FIG. 1 comprises an access node 1 with a number of subscribers $2^1$, $2^2$, $2^3$, $2^4$, $2^5$ and $2^6$ connected to it. The access node 1 is connected to a local exchange 3 and it operates between the subscribers $2^1$, $2^2$, $2^3$, $2^4$, $2^5$ and $2^6$, connecting subscribers to the local exchange as illustrated by FIG. 1. The link between the access node 1 and the local exchange 3 is a V5.2 interface 4 comprising 1–16 PCM lines (2 Mbit/s), and the local exchange is provided with functions required by the V5 interface. Further, subscribers $2^1$, $2^2$, $2^3$ are connected to the access node via a subscriber module 5, to which it is possible to connect analogue or ISDN subscribers. Depending on the subscribers, the subscriber module 5 is connected to the access node 1 via module lines or via a digital link. Subscribers $2^4$, $2^5$ and $2^6$ are connected to the access node via a remote subscriber node 6. The remote subscriber node is connected to the access node 1 via a PCM line 7.

Figure 2A:
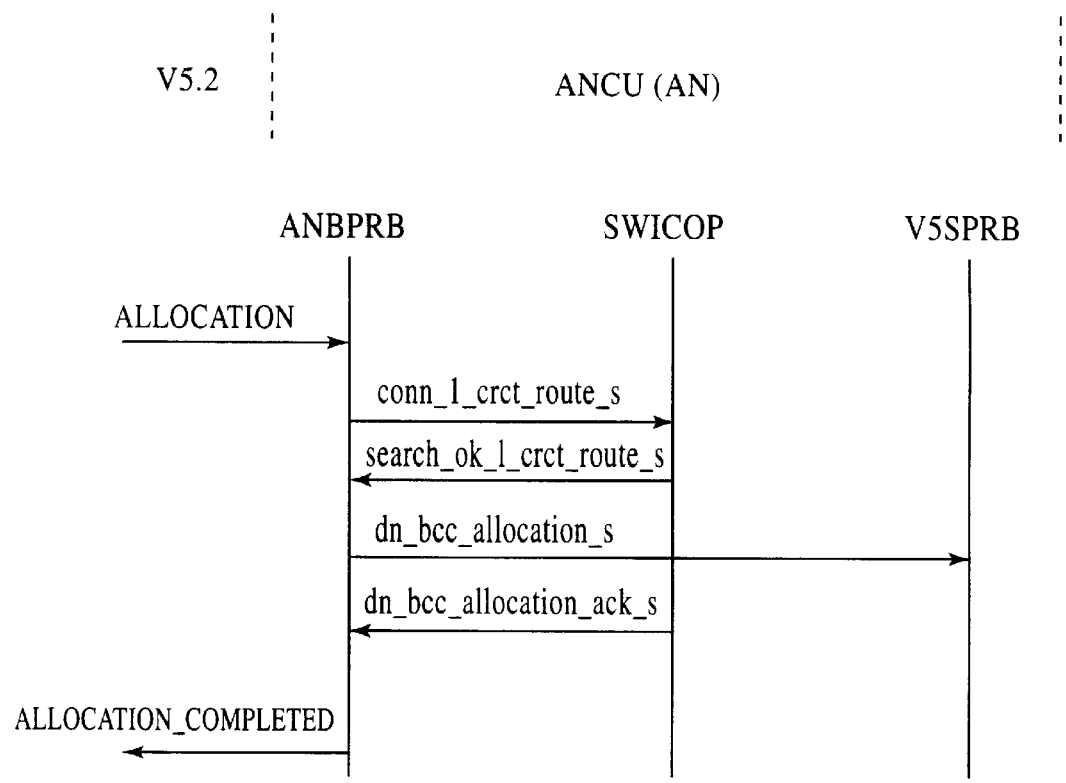
FIG. 2a presents an example of the scanning of a free module line.

FIG. 2a presents a signalling diagram for a PSTN transmission line, illustrating the use of the BCC protocol for the scanning of a subscriber module line in an access node in which concentration is done in the subscriber module line as well. First, the BCC protocol reserves for the relevant PSTN port the essential resources, which in the case of subscribers $2^1$, $2^2$, $2^3$ in FIG. 1 means reserving a module line. The signalling progresses according to FIG. 2a as follows. The local exchange first transmits to the BCC protocol object associated with the access node an ALLOCATION message whose information element contains data given by the local exchange 3, specifying a PCM line and a time slot in the V5 interface. Based on this, the program block ANBPRB of the V5 BCC protocol obtains from the MODULE file a direction to the subscriber port in question and switches the input side to low sound. Further, the module line specified is indicated to the PSTN protocol, which performs a through connection in the access node. Finally, an ALLOCATION_COMPLETED message is sent to the local exchange 3.

Figure 2B:
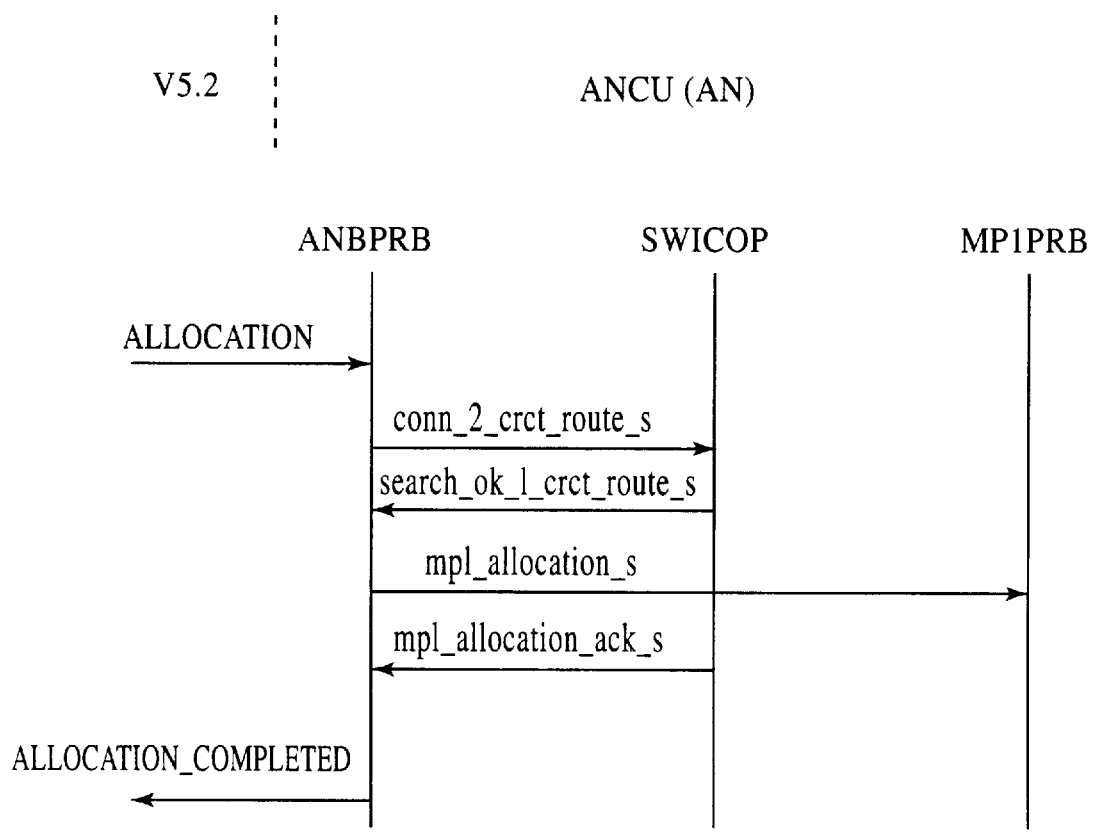
FIG. 2b presents an example of the scanning of a time slot.

FIG. 2b presents a signalling diagram for an ISDN transmission line, illustrating the use of the BCC protocol for the scanning of a subscriber module line in an access node in which concentration is done in the subscriber module line as well. The signalling progresses according to FIG. 2b as follows. The local exchange first transmits to the BCC protocol object associated with the access node an ALLOCATION message whose information element contains data given by the local exchange 3, specifying a PCM line and a time slot in the V5 interface. Based on this, the program block ANBPRB of the V5 BCC protocol obtains from the MODULE file a direction to the subscriber port in question. Further, the module line specified is converted into a form acceptable to the subscriber module and indicated to the subscriber module. Thus, the through connection is performed using the BCC protocol. Finally, an ALLOCATION_COMPLETED message is sent to the local exchange 3.

In the signalling diagrams, abbreviations are used as follows: ANCU is a call control and signalling computer in the concentrator; ANBPRB is the program block of the V5 BCC protocol; SWICOP is the program block of the access node group switch; and MP1PRB is the ISDN program block in the subscriber module (program for the transmission of ISDN LAPD frames).

The invention is not limited to the examples of its embodiments described above, but instead many variations are possible within the framework of the inventive idea defined by the claims.

What is claimed is:

1. A method for scanning a module line or time slot in a V5 access node connected to a local exchange via a V5 interface with a number subscribers connected to the V5 access node via a concentrating link, the method comprising:

scanning a time slot in the V5 interface by transmitting a scanning message by means of a part of a Bearer Channel Connection protocol associated with the local exchange to a part of the Bearer Channel Connection protocol associated with the V5 access node, before acknowledging receipt of the scanning message at the part of the Bearer Channel Connection protocol associated with the V5access node, and acknowledging receipt of the scanning message, scanning a concentrating subscriber interface to find a free module line or time slot in the concentrating subscriber interface.

2. The method as recited in claim 1, wherein the scanned module line or time slot is reserved for use in call setup; and the module line or time slot is connected through the access node to a subscriber port specified by the local exchange.

3. The method as recited in claim 1, wherein in the access node data indicating the V5 interface time slot to be used is received from the local exchange;

a route to a subscriber port specified by the local exchange is determined;

the module line or time slot is indicated to the protocol controlling a switching; and a through connection is performed to set up a user channel between the local exchange and the subscriber port.

4. The method as recited in claim 1, wherein, if a user channel is a Public Switched Telephone Network user channel, then in the access node the switching of the module line is performed using the Public Switched Telephone Network protocol, which transmits a signaling of analogue subscribers in the V5 interface.

5. The method as recited in claim 1, wherein, if a user channel is an Integrated Services Digital Network B-channel, the Bearer Channel Connection protocol is used for the switching of the time slot.

6. The method as recited in claim 3, wherein when a Public Switched Telephone Network user channel is to be disconnected, the subscriber port reservation data are deleted via the Bearer Channel Connection protocol and the link is disconnected via the Public Switched Telephone Network protocol.

7. The method as recited in claim 3, wherein when an Integrated Services Digital Network user channel is to be disconnected the subscriber port reservation data are deleted and the link is disconnected via the Bearer Channel Connection protocol.

8. The method as recited in claim 1, wherein subscribers are connected to the V5 access node via a remote subscriber node connected to the V5 access node via a concentrating link.

9. The method as recited in claim 1, wherein subscribers are connected to the V5 access node via a subscriber module connected to the V5 access node via a concentrating link.

* * * * *